United States Patent
Ogawa et al.

(10) Patent No.: US 7,382,559 B2
(45) Date of Patent: Jun. 3, 2008

(54) RECOVERY PROCESSING METHOD FOR DEVICE SPECIFIC INFORMATION OF MEDIUM STORAGE DEVICE AND MEDIUM STORAGE DEVICE

(75) Inventors: Takehiro Ogawa, Kawasaki (JP); Yoshinori Inoue, Kawasaki (JP); Hiroaki Murai, Kawasaki (JP); Satoru Fukase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 11/167,696

(22) Filed: Jun. 27, 2005

(65) Prior Publication Data

US 2006/0203374 A1   Sep. 14, 2006

(30) Foreign Application Priority Data

Mar. 10, 2005   (JP) ............................... 2005-066667

(51) Int. Cl.
*G11B 5/09* (2006.01)
(52) U.S. Cl. .......................................... 360/31; 360/53
(58) Field of Classification Search ...................... None
See application file for complete search history.

(56) References Cited

U.S. PATENT DOCUMENTS

| | | | | |
|---|---|---|---|---|
| 6,094,317 A * | 7/2000 | Chung | .......................... | 360/53 |
| 6,735,037 B1 * | 5/2004 | Tanaka et al. | ................ | 360/75 |
| 2004/0184784 A1 * | 9/2004 | Kurano | ........................ | 386/95 |

FOREIGN PATENT DOCUMENTS

| | | |
|---|---|---|
| JP | 62-250563 | 10/1987 |
| JP | 4-114371 | 4/1992 |
| JP | 4-245072 | 9/1992 |

\* cited by examiner

*Primary Examiner*—Andrea Wellington
*Assistant Examiner*—Varsha A. Kapadia
(74) *Attorney, Agent, or Firm*—Greer, Burns & Crain, Ltd.

(57) ABSTRACT

A medium storage device reads device specific information from a medium to a memory and performs read/write operation to the medium, which allows receiving commands from a host even if a read error of the device specific information occurs. When an error occurs during the device specific information read processing of the medium storage device after power ON, the alternate data stored in the medium is developed so as to recover the power ON error artificially. For this alternate data, the data at factory shipment is saved in a ROM or a system area of a medium in advance, and is developed from here when necessary. Since commands can be received and executed, a disabled startup of the host system can be prevented.

19 Claims, 6 Drawing Sheets

FIG. 3

| DEFECTIVE SECTOR MANAGEMENT INFORMATION | | 190 |
|---|---|---|
| MANAGEMENT INFORMATION AT SHIPMENT | | 190-1 |
| REPLACEMENT SOURCE SECTORS | REPLACEMENT DESTINATION SECTORS | |
| MANAGEMENT INFORMATION DURING OPERATION | | 190-2 |
| REPLACEMENT SOURCE SECTORS | REPLACEMENT DESTINATION SECTORS | |
| SMART DRIVE ATTRIBUTE VALUES | | 192 |
| POWER ON TIME(ACCUMULATION) | | |
| READ/WRITE ERROR RATE(ACCUMULATION) | | |

RECOVERY PROCESSING METHOD FOR DEVICE SPECIFIC INFORMATION OF MEDIUM STORAGE DEVICE AND MEDIUM STORAGE DEVICE

CROSS-REFERENCE TO RELATED APPLICATIONS

This application is based upon and claims the benefit of priority from the prior Japanese Patent Application No. 2005-066667, filed on Mar. 10, 2005, the entire contents of which are incorporated herein by reference.

BACKGROUND OF THE INVENTION

1. Field of the Invention

The present invention relates to a recovery processing method for a device specific information which operates by developing device specific information, stored on a medium, onto a memory, and more particularly to a recovery processing method for device specific information for executing recovery processing for read errors of updated device specific information which are stored on a medium, and the medium storage device.

2. Description of the Related Art

Because of the recent demand for the computerized processing of data, a capacity increase is demanded for the medium storage devices of magnetic medium devices and optical medium devices for storing data. Therefore the track density and the recording density of medium storage devices are constantly increasing. In such medium storage devices, it is indispensable to monitor the state of the medium and the state of the read and write, so device specific information is stored in a medium which is a non-volatile memory for each device.

The device specific information includes information to be updated. In the case of a magnetic disk device, for example, if automatic replacement processing is generated, the addresses of an error sector (replacement source sector) and the replacement destination sector which took over the error sector are registered in the defective sector management information, and must be held even if power is turned OFF (see Japanese Patent Application Laid-Open No. H4-245072).

The SMART (Self Monitoring Analysis Report Technology) drive attribute values, which are guarantee information, includes information which is accumulated when the magnetic medium device is operating, such as the power ON time and the read/write error rate, and this information also must be held even if power is turned OFF.

In this way the magnetic disk device has information which is updated after shipment, and must be held even if power is turned OFF, and this information is stored as device specific information in a non-volatile memory or in the system area on the medium to which the user cannot access.

And when power is turned ON, information which has been updated/accumulated up to the point when power was turned OFF the last time is loaded, and this information is updated/accumulated. Therefore when power is turned ON, information must be read from the non-volatile memory or from the system area on the medium.

In such a magnetic disk device, an enormous size of data is required for the defective sector management information and the SMART information as the capacity of the medium increases. This data is indispensable for the normal execution of medium access and command operation of the magnetic disk device, and is stored in the device specific area on the medium.

The above data is read by the power ON sequence, resides in a memory, is updated during the operation of the magnetic disk device, and is stored in the device specific area of the medium regularly or at a predetermined timing, such as when a command is received.

Because of the recent popularization of mobile equipment, such a medium storage device is also mounted on mobile equipment (e.g. notebook personal computers, portable AV (Audio/Visual) equipment)). In this operating environment, write errors tend to occur in the medium storage device because of temperature changes and vibration. Therefore if device specific information is written and stored in the system area on the medium under such an environment, the device specific information may not be read when power is turned ON the next time.

For example, when vibration is applied to a disk device, an off-track motion may occur and the drive specific information may not be able to be accurately written to the target track. In this case, in the subsequent power ON sequence, the device specific information cannot be read even if the head seeks the target track.

In the same way, because of recording density which is becoming increasingly dense lately, an off-track motion tends to occur when the temperature is different, and, for example, if the temperature changes between the write and read of the device specific information, a write error occurs when a device specific information is stored, and if power is shut OFF in this status, an error occurs in reading the device specific information in the subsequent power ON sequence.

The device specific information of the disk device includes information which is indispensable for executing commands, and if this information cannot be read during the power ON sequence, the disk device may not operate normally. Also if the device specific information which was read with error is defective management information, normal medium access cannot be guaranteed.

In other words, if the defective sector management information cannot be read in a device where automatic replacement processing is generating, not the replacement destination sector but the replacement source sector is accessed. The replacement source sector is the sector where an error originally occurred, and the data has been written to the replacement destination sector, so a read error or a data comparison error occurs. Also if the defective sector information registered at shipment is included in the defective sector management information, accessing the defective sector at shipment may occur.

In the same way, if the SMART drive attribute information cannot be read, commands cannot be executed since the attribute values to be reported to the host by the SMART commands do not exist.

Once the disk device enters the above mentioned status, normal operation cannot be guaranteed, so a self diagnosis error or an abort of the received command occurs. Also if the disk device ended all the commands issued from the host system as an abort or error, the host system may not be started up, then the backup operation for the data stored in the disk device cannot be executed either.

SUMMARY OF THE INVENTION

With the foregoing in view, it is an object of the present invention to provide a recovery processing method for device specific information and a medium storage device for recovering the device specific information and enabling the receipt of commands from the host even if a write error occurs to the updated device specific information.

It is another object of the present invention to provide a recovery processing method for device specific information and a medium storage device for artificially recovering the device specific information even if a write error occurs to the device specific information.

It is still another object of the present invention to provide a recovery processing method for device specific information and a medium storage device for preventing a read error of the device specific information when power is turned ON even if a write error occurs to the device specific information.

It is still another object of the present invention to provide a recovery processing method for device specific information and a medium storage device for protecting the write data from the host even if a read error of the device specific information occurs when power is turned ON.

To achieve these objects the medium storage device of the present invention has a head for either reading or writing data on a track of a storage medium, an actuator for positioning the head on a desired track of the storage medium, a memory for storing device specific information, and a control unit for receiving a command from a host, controlling the actuator referring to the device specific information of the memory, and executing either a read or write of data on the desired track by the head. And the control unit positions the head on a system area of the storage medium when power is turned ON, reads the device specific information stored in the system area and develops it onto the memory, and when a read error is detected, the control unit reads alternate information of the device specific information stored in a non-volatile memory and develops it onto the memory.

The recovery processing method for device specific information of a medium storage device has a step of positioning the head on a system area of the storage medium when power is turned ON and reading the device specific information stored in the system area to the memory, a step of judging whether a read error occurred, and a step of reading alternate information of the device specific information stored in a non-volatile memory and developing it onto the memory when the read error is detected.

In the present invention, it is preferable that the control unit updates the device specific information of the memory when the read/write is executed, and at least writes the device specific information on the memory to the system area of the storage medium by the head when power is turned OFF.

In the present invention, it is also preferable that the device specific information and the alternate information have at least the defective sector management information of the storage medium.

In the present invention, it is also preferable that the device specific information and the alternate information have at least the defective sector management information and the SMART information of the storage medium.

In the present invention, it is also preferable that the non-volatile memory for storing the alternate information of the device specific information is the storage medium.

In the present invention, it is also preferable that the control unit updates the alternate information of the device specific information of the memory when the read/write is executed, and at least when power is turned OFF the control unit writes the alternate information of the device specific information of the memory to the system area of the storage medium by the head.

In the present invention, it is also preferable that the control unit stores the write data from the host in a temporary storage memory after developing the alternate information onto the memory, and when a read request is received from the host the control unit reads the data on the temporary storage memory and transfers it to the host.

In the present invention, it is also preferable that the control unit writes back the write data on the temporary storage memory to the storage medium by the head when a request from the host is not received.

In the present invention, it is also preferable that the control unit sends notification to the device user after the alternate information is developed onto the memory.

In the present invention, it is also preferable that the storage medium is a magnetic disk.

According to the present invention, if an error occurs to the medium storage device during the device specific information read processing after power is turned ON, the alternate data is developed and the power ON error is artificially recovered, so commands can be received. For this alternate data, the data at shipment is saved in a non-voluntary memory (ROM) or a system area of a medium in advance, and is developed when necessary. An accurate command operation may not be executed by the development of the alternate data, but commands can be received and executed, so a disabled startup of the host system can be prevented.

BRIEF DESCRIPTION OF THE DRAWINGS

FIG. 3 is a table explaining the device specific information in FIG. 2;

DESCRIPTION OF THE PREFERRED EMBODIMENTS

Embodiments of the present invention will now be described in the sequence of the medium storage device, first embodiment of the recovery processing of device specific information, second embodiment of the recovery processing of device specific information, and other embodiments.

Medium Storage Device

Figure 1:
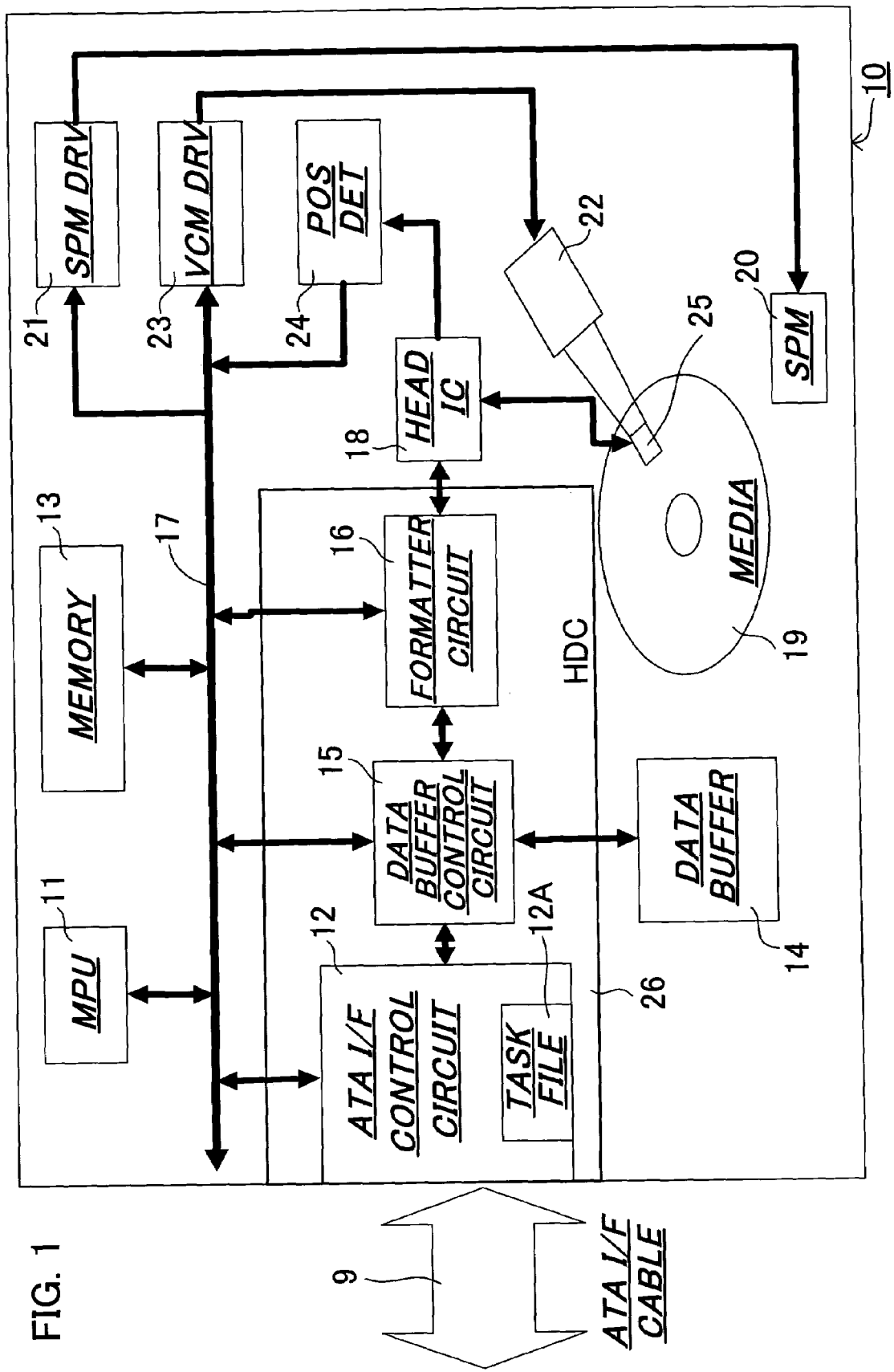
FIG. 1 is a block diagram depicting the medium storage device according to an embodiment of the present invention.
Figure 2:
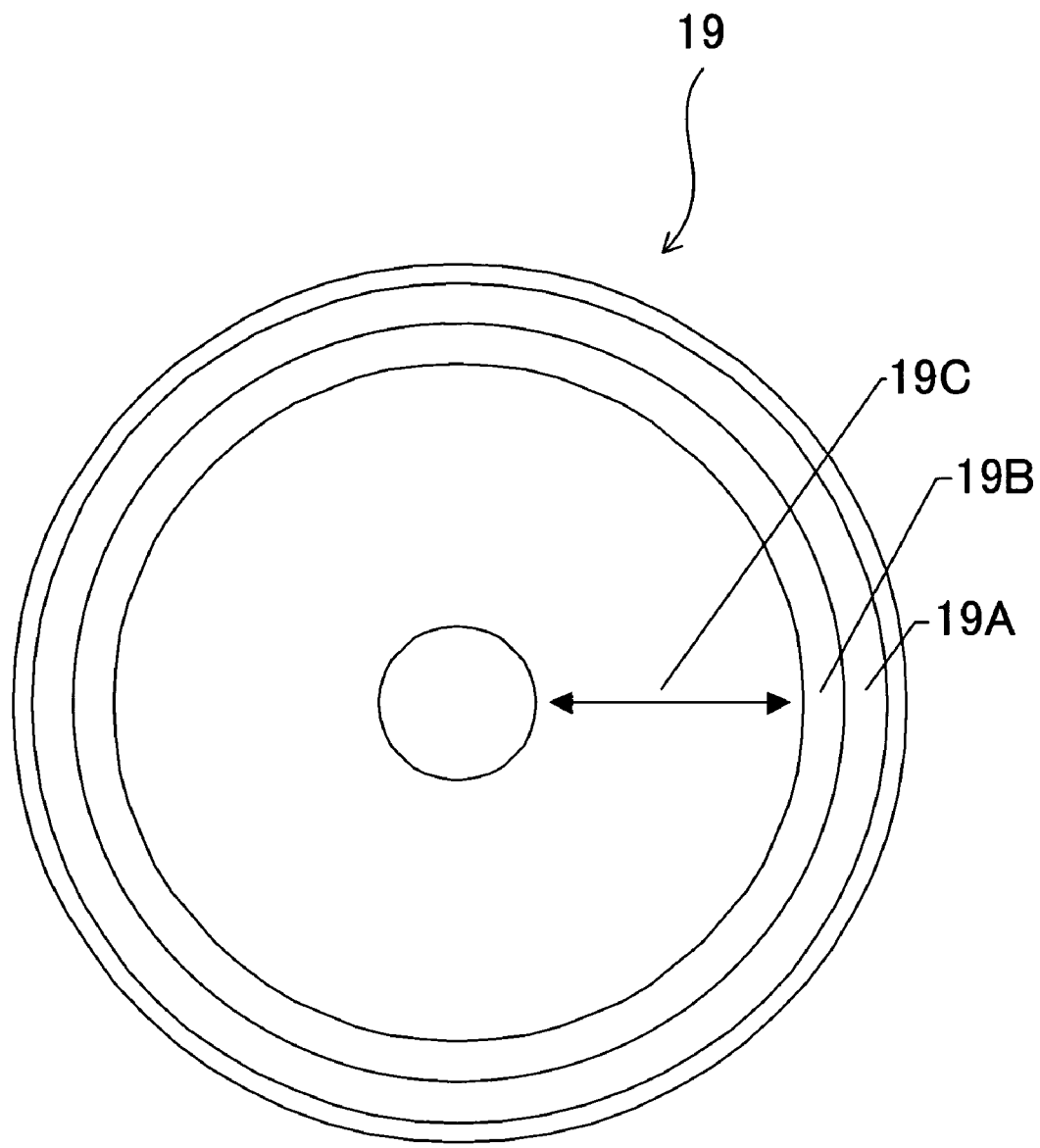
FIG. 2 is a diagram depicting the areas of the medium in FIG. 1.

FIG. 1 is a block diagram depicting the medium storage device according to an embodiment of the present invention, FIG. 2 is a diagram depicting the disk medium in FIG. 1, and FIG. 3 is a table explaining the device specific information in FIG. 2. In FIG. 1, a magnetic disk device (Hard Disk Drive), which reads/writes data on a magnetic disk, is shown as an example of the medium storage device.

The magnetic disk device 10 is built into the personal computer, as shown in FIG. 1, and is connected with the host of the personal computer via an ATA (AT Attachment) standard interface cable 9.

The magnetic disk device 10 has a magnetic disk 19, a spindle motor 20 for rotating the magnetic disk 19, a magnetic head 25 for reading/writing data on the magnetic disk 19, and an actuator (VCM) 22 for moving the magnetic head 25 in the radius direction (track crossing direction) of the magnetic disk 19.

The control unit has an HDC (Hard Disk Controller) 26, data buffer 14, MPU 11, memory (RAM) 13, head IC 18, spindle motor driver 21, VCM driver 23, position detection unit 24 and bus 17 for connecting these composing elements.

The HDC 26 has an ATA interface control circuit 12 which has a task file 12A for setting a task from the host, a data buffer control circuit 15 for controlling the data buffer 14, and a formatter control circuit 16 for controlling the format of the recording data.

The head IC 18 supplies recording current to the magnetic head 25 according to the recording data during writing, and amplifies the read signal from the magnetic head 25 and outputs the read data (including servo information) during the reading. The position detection unit 24 detects the position of the magnetic head 25 based on the servo information from the head IC 18.

The spindle motor driver 21 rotary-drives the spindle motor 20. The VCM driver 23 drives the VCM 22 for moving the magnetic head 25. The MPU (Micro Processor) 11 performs position control of the magnetic head 25, read/write control, and retry control. The memory (RAM) 13 stores the data required for processing the MPU 11.

FIG. 2 is a diagram depicting the data area of the magnetic disk 19. The data area is divided into the user data area (LBA '0'-LBA 'n−1') 19C which the user can access, and other system areas 19A and 19B. In the alternate data storage area 19A of the system area, the device specific information at shipment is stored as the alternate data in advance. In the device specific information storage area 19B of the system area, the device specific information, which is updated when HDD is operating, is stored.

As FIG. 3 shows, the device specific information includes the defective sector management information 190 and the SMART drive attribute values 192. The defective sector management information 190 is a corresponding table storing the replacement source sectors which have defects and the replacement destination sectors. This defective sector management information 190 is comprised of the management information 190-1, which is detected during the defective sector test at the factory and is set at shipment and the management information of the defective sectors 190-2 detected during operation. In the SMART drive attribute values 192, the power ON time and the read/write error rate, for example, are stored. After shipment, the alternate data storage area 19A is not updated, and is separated from the device specific information storage area 19B, so the alternate data storage area 19A is not affected even if an error is generated when the device specific information of the storage area 19B is updated.

In the device specific information storage area 19B, the management information 190-2 during operation in the defective sector management information 190, is updated every time defective sector replacement processing is executed, and the SMART drive attribute values 192 are updated when power is turned OFF.

The MPU 11 in FIG. 1 reads the device specific information area 19B of the magnetic disk 19, and develops it onto the memory 13 when power is turned ON. And using this device specific information developed onto the memory 13, the MPU 11 recognizes the position information of the defective sector on the medium, accesses the magnetic disk 19 for read/write and executes replacement processing, and then updates the device specific information. In the same way, the MPU 11 accumulates information on the error rate and power ON time, and updates the SMART drive attribute values. And according to the SMART commands from the host, the MPU 11 transfers the SMART drive attribute values to the host.

In the power OFF sequence, the MPU 11 writes the device specific information, which was developed and updated on the memory 13, to the device specific information area 19B of the magnetic disk 19 and stores it.

First Embodiment of Recovery Processing of Device Specific Information

Figure 4:
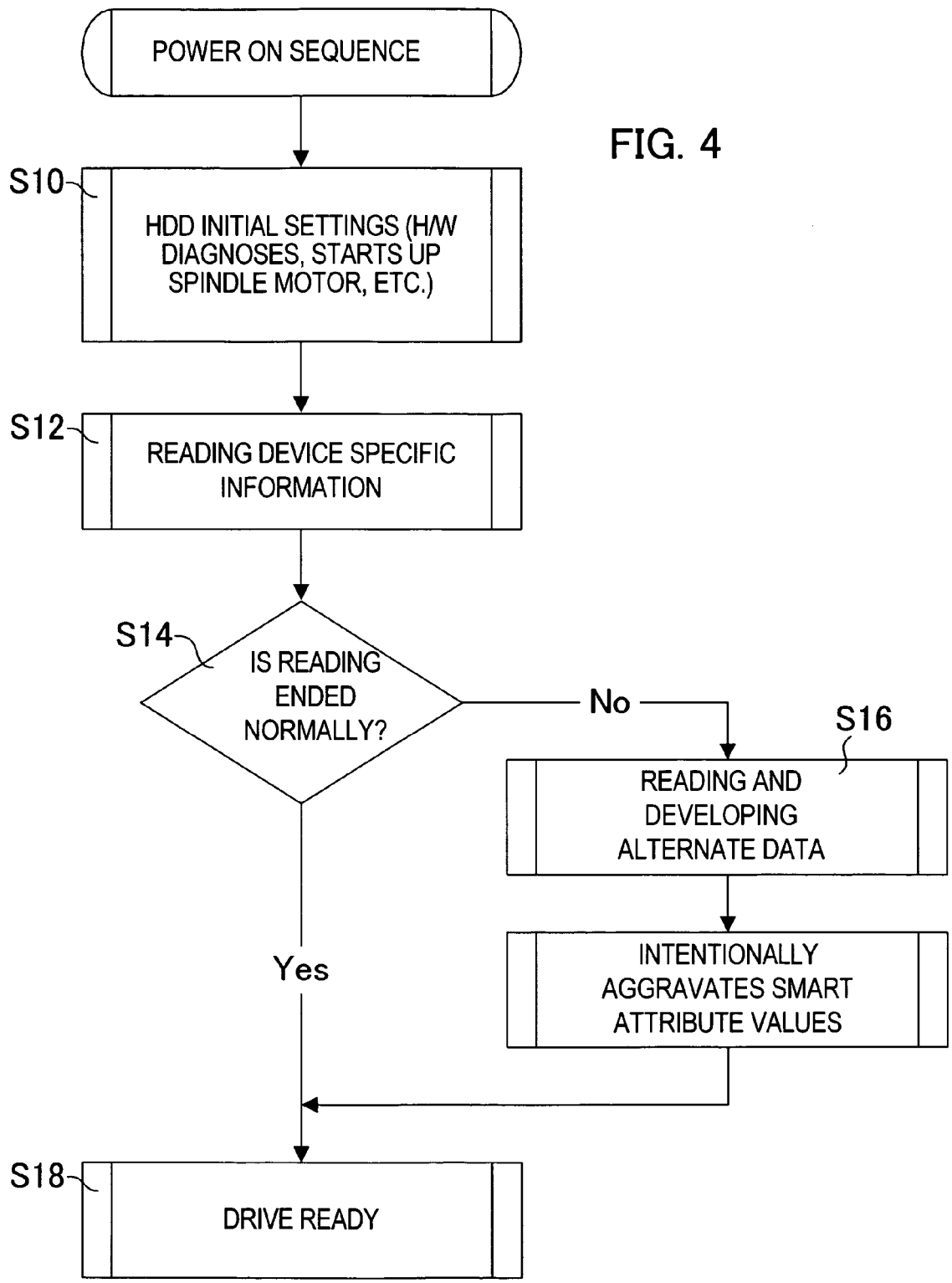
FIG. 4 is a flow chart depicting the power ON sequence according to an embodiment of the present invention.

FIG. 4 is a flow chart depicting the recovery processing of device specific information according to an embodiment of the present invention.

(S10) After power is turned ON, the MPU 11 executes the necessary initial settings. In other words, the MPU 11 diagnoses the hardware and starts up the spindle motor 20. For example, the memory 13 and the HDC 26 are diagnosed and if the result of the diagnosis is good, the initial settings of the necessary registers are performed, and the spindle motor 20 is started up.

(S12) When the spindle motor 20 is successfully started up, the MPU 11 drives the VCM 22 via the VCM driver 23, and positions the magnetic head 25 on the device specific information storage area 19B of the magnetic disk 19. By this, the magnetic head 25 executes the reading of the information of the device specific information storage area 19B of the magnetic disk 19.

(S14) The MPU 11 judges whether the reading of the device specific information to the memory 13 ended normally. If it is judged as a normal end, the processing advances to step S18. On the other hand, when a read data block of which error cannot be corrected is detected in the formatter control circuit 16, or when a desired read level cannot be obtained, even if the amplifier gain of the head IC 18 is set to the maximum, a read error occurs and reading does not end normally.

(S16) If the MPU 11 judges that the reading of the device specific information to the memory 13 does not end normally, the MPU 11 drives the VCM 22 via the VCM driver 23, and positions the magnetic head 25 on the alternate data storage area 19A of the magnetic disk 19. By this, the magnetic head 25 executes the reading of information on the alternate data storage area 19A of the magnetic disk 19, and develops the alternate data onto the memory 13. And to notify an abnormality to the host, the MPU 11 intentionally aggravates the SMART attribute values of the memory 13 which were read. For example, the MPU 11 manipulates the error rate in FIG. 3 to set the error rate higher.

(S18) Then the MPU 11 notifies READY to the host via the interface circuit 12 of the HDC 26.

In this way, if an error occurs in the device specific information read processing after power of the magnetic disk device is turned ON, the alternate data is developed, and the power ON error is artificially recovered so as to enable receiving commands. For this alternate data, the data at shipment is stored in ROM (Read Only Memory), not shown in Figures, or in the system area of the medium in advance, and is developed from here when necessary.

By developing the alternate data, it is possible that an accurate command operation cannot be executed, but since commands can be received and executed, a disabled startup of the host system can be prevented. When such a status occurs, the host system can detect an abnormality of the magnetic disk device by aggravating the SMART attribute values.

The test data, installed at the factory, is stored in the system area and is not updated after shipment, so it can always be read. By developing this alternate data, accessing defective sectors at shipment can be prevented.

For the SMART drive attribute values, the guaranteed failure threshold values may be developed as alternate data. In this case however, the guaranteed failure threshold values are the default, and the data of which an attribute is aggravated is stored.

Second Embodiment of Recovery Processing of Device Specific Information

Even if the alternate data is developed in this way, in some cases normal medium access (access of user area 19c of the magnetic medium 19) may not be initially guaranteed, because of a device specific information read error, although commands can be received. For example, when an error occurs to the reading of defective sector information and only the defective sector information at shipment can be acquired, and when the number of defective sectors after shipment is high, replacement processing occurs with frequency for one command where the read/write processing may not be executed within a time expected by the host.

Figure 5:
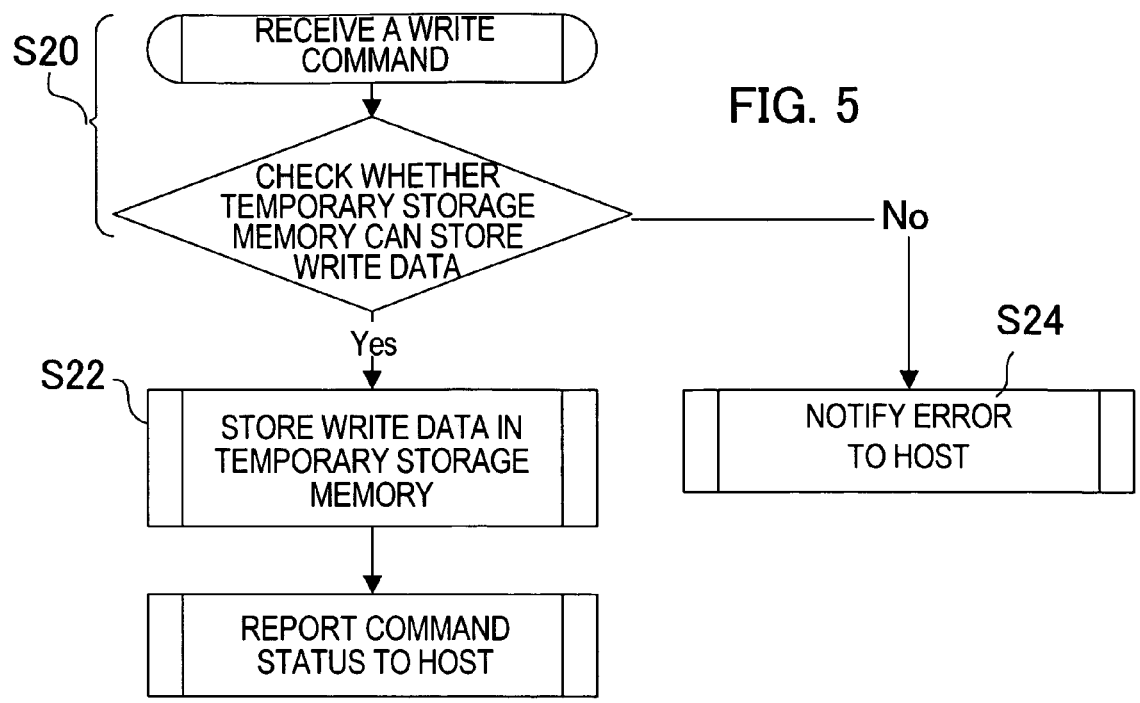
FIG. 5 is a flow chart depicting the write command processing according to another embodiment of the present invention.
Figure 6:
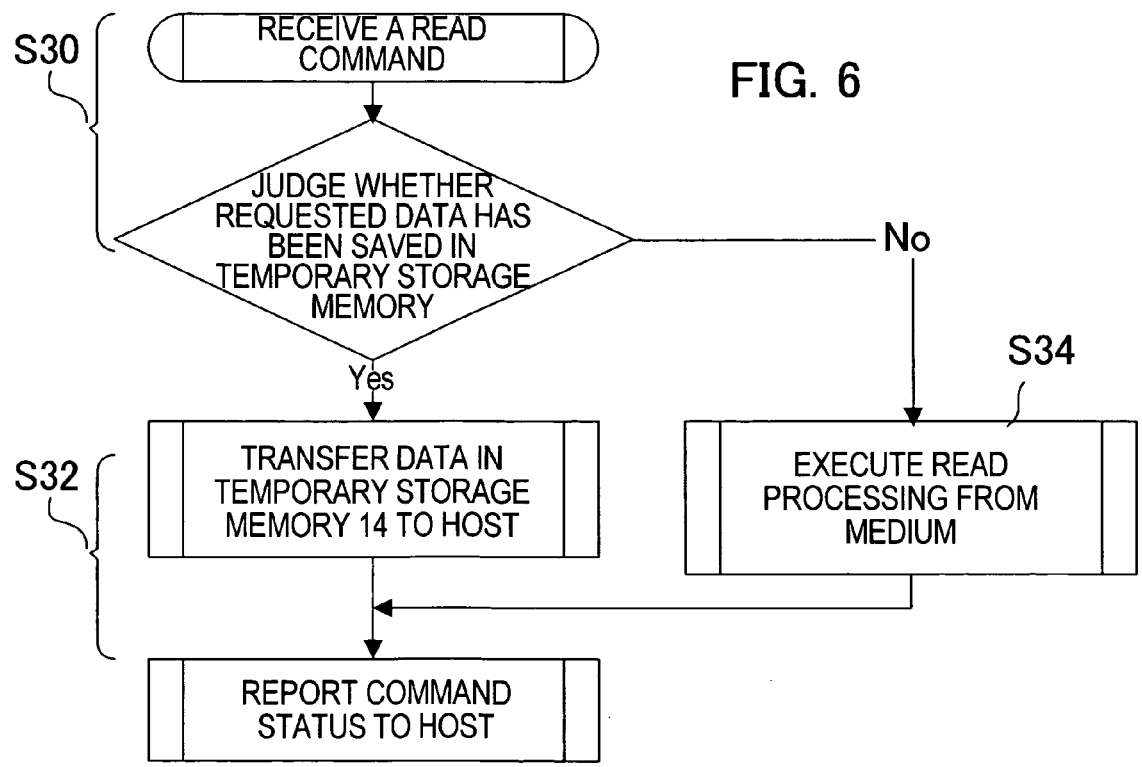
FIG. 6 is a flow chart depicting the read command processing according to another embodiment of the present invention.

In such a case, it is preferable to execute the write processing in FIG. 5 and the read processing in FIG. 6 by settings. FIG. 5 is a flow chart depicting the write command processing when an error occurs in the device specific information reading and normal medium access cannot be guaranteed.

(S20) When the MPU 11 receives a write command from the host via the ATA interface circuit 12, the MPU 11 checks whether the temporary storage memory (e.g. buffer memory 14) has an open area and can store the write data.

(S22) If storing is possible, the MPU 11 stores the write data from the host in the temporary storage memory 14, and reports the command status to the host.

(S24) If the temporary storage memory 14 does not have an open area, the MPU 11 notifies the error to the host.

FIG. 6 is a flow chart depicting the read command processing when an error occurs during the reading of device specific information and normal medium access cannot be guaranteed.

(S30) When the MPU 11 receives a read command from the host via the ATA interface circuit 12, the MPU 11 judges whether the requested data of the received read command has been saved in the temporary storage memory 14.

(S32) If it is judged that the requested data is saved in the temporary storage memory 14, the MPU 11 transfers the data in the temporary storage memory 14 as the read data using the buffer control circuit 15 to the host, and reports the command status to the host.

(S34) If the requested data is not saved in the temporary storage memory 14, the MPU 11 executes the read processing from the medium (magnetic medium) 19. In this case, defective sectors after shipment cannot be initially read, but the other sectors can be read. If the data cannot be read, the MPU 11 reports the error to the host.

In this way, if an error occurs 10 during the reading of the device specific information and normal medium access cannot be guaranteed, medium access can be avoided and data can be protected by saving the write data to the memory. And using the time when the host is not accessing, the write data of the temporary storage memory 14 is written back to the magnetic disk 19.

In this case, the response time to the host is not affected, so if a defective sector is detected, replacement processing can be executed, and the defective sector information of the device specific information can be updated. In other words, the alternate data on the memory 13 becomes gradually closer to the content of the device specific information of which the read error occurred.

Figure 7:
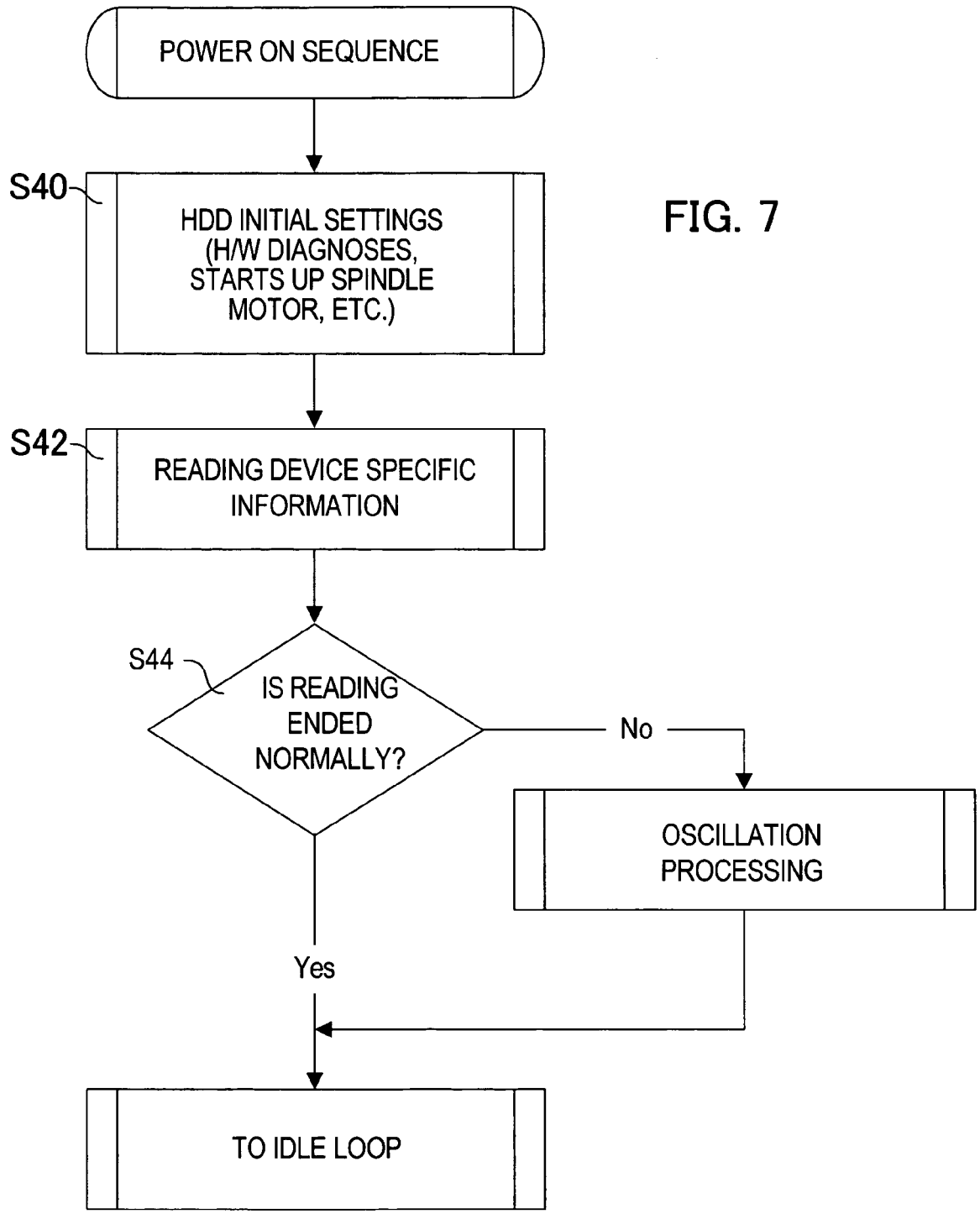
FIG. 7 is a flow chart depicting the read error processing according to the other embodiment of the present invention.

When the alternate data is developed at the occurrence of the device specific information read error in FIG. 4, it is preferable to execute notification processing to the user, since the performance of the device drops. FIG. 7 is a flow chart depicting the user notification processing when the device specific information read error occurred.

(S40) Just like step S10, the MPU 11 executes the necessary initial settings after power is turned ON.

(S42) Just like step S12, the MPU 11 drives the VCM 22 via the VCM driver 23 and positions the magnetic head 25 onto the device specific information storage area 19B of the magnetic disk 19. By this, the magnetic head 25 executes the reading of the information of the device specific information storage area 19B of the magnetic disk 19.

(S44) Just like step S14, the MPU 11 judges whether the reading of the device specific information to the memory 13 ended normally. If it is judged as a normal end, the processing advances to IDLE loop. If an error occurred during the reading of the device specific information, on the other hand, the MPU 11 executes oscillation processing to notify the abnormality to the user. For example, a buzzer (a sound generator or an indicator) is installed in the magnetic disk device, and the buzzer is oscillated to notify the abnormality to the user by sound, and the processing advances to IDLE loop.

Other Embodiments

In the above embodiments, the device specific information was described using the configuration in FIG. 3, but other attribute values (e.g. threshold values automatically adjusted according to the status of the drive, and setup information) can be used for the SMART drive attribute values. The medium storage device was described using the magnetic disk device, but the present invention can be applied to storage devices using other storage medium, such as an optical medium and a magneto-optical medium.

The interface is not limited to ATA, but the present invention can be applied to other interfaces. The alternate data of the device specific information is stored, not limited to a medium, but may be stored in another non-volatile memory.

The present invention was described by embodiments, but the present invention can be modified in various ways within the scope of the essential characteristics of the present invention, and these shall not be excluded from the scope of the present invention.

When an error occurs in the device specific information reading processing of the medium storage device after power is turned ON, the alternate data is developed and a power ON error can be artificially recovered, so commands can be received. Since commands can be received and executed, a disabled startup of the host system can be prevented, and therefore it is effective to apply the present invention to a medium storage device to be used in an environment where vibration and changes of temperature are major.

What is claimed is:

1. A storage medium device, comprising:
   a storage medium having a system area for storing device specific information;
   a head for either reading or writing data on a track of a storage medium;
   an actuator for positioning said head on a desired track of said storage medium;
   a memory for storing at least one of alternative device specific information, and device specific information indicating device status updated according to an operation of the device; and
   a control unit for receiving a command from a host, controlling said actuator referring to the device specific information of said memory, and executing either read or write of data on said desired track by said head,
   wherein said control unit positions said head on a system area of said storage medium when power is turned ON, reads said device specific information stored in said system area and develops said device specific information onto said memory, and reads said alternate device specific information stored in said storage medium and develops said alternate device specific information on said memory when detecting read error of said device specific information from the system area, and
   wherein said alternate device specific information indicates an initial device status before an updating according to the operation of the device.

2. The storage medium device according to claim 1, wherein said control unit updates the device specific information of said memory when said read/write is executed, and at least writes the device specific information on said memory to said system area of said storage medium by said head when power is turned OFF.

3. The storage medium device according to claim 1, wherein said device specific information and said alternate device specific information have at least defective sector management information of said storage medium.

4. The storage medium device according to claim 1, wherein said device specific information and said alternate device specific information have at least defective sector management information and Self Monitoring Analysis Report Technology (SMART) information of said storage medium.

5. The storage medium device according to claim 1, wherein said control unit updates the alternate device specific information of said memory when said read/write is executed, and at least writes the alternate device specific information on said memory to said system area of said storage medium by said head when power is turned OFF.

6. The storage medium device according to claim 1, wherein said control unit stores the write data from said host in a temporary storage memory after developing said alternate device specific information on said memory, and when a read request is received from said host, said control unit reads the data on said temporary storage memory and transfers the data to said host.

7. The storage medium device according to claim 6, wherein said control unit writes back the write data on said temporary storage memory to said storage medium by said head when a request from said host is not received.

8. The storage medium device according to claim 1, wherein said control unit sends notification to the device user after said alternate device specific information is developed onto said memory.

9. The storage medium device according to claim 1, wherein said storage medium comprises a magnetic disk.

10. A recovery processing method for device specific information of a storage medium device which positions a head on a desired track of a storage medium having a system area for storing device specific information; and either reads or writes data on said track, comprising the steps of:
   positioning said head on a system area of said storage medium when power is turned ON and reading the device specific information indicating device status updated according to an operation of the device stored in said system area to a memory;
   judging whether said read error occurred; and
   reading alternate device specific information stored in said storage medium and developing said alternate device specific information onto said memory when detecting said read error of said device specific information stored in said system area, and
   wherein said alternate device specific information indicates an initial device status before an updating according to the operation of the device.

11. The recovery processing method for device specific information of a storage medium device according to claim 10, further comprising the steps of:
   updating the device specific information of said memory when said read/write is executed, and
   writing the device specific information of said memory to said system area of said storage medium by said head at least when power is turned OFF.

12. The recovery processing method for device specific information of a storage medium device according to claim 10, wherein said device specific information and said alternate device specific information have at least defective sector management information of said storage medium.

13. The recovery processing method for device specific information of a storage medium device according to claim 10, wherein said device specific information and said alternate device specific information have at least defective sector management information and Self Monitoring Analysis Report Technology (SMART) information of said storage medium.

14. The recovery processing method for device specific information of a storage medium device according to claim 10, further comprising the steps of:
   updating alternate device specific information of said memory when said read/write is executed, and
   writing the alternate device specific information of said memory to said system area of said storage medium by said head at least when power is turned OFF.

15. The recovery processing method for device specific information of a storage medium device according to claim 10, further comprising the steps of:
   storing write data from said host to a temporary storage memory after developing said alternate device specific information on said memory, and
   reading data on said temporary storage memory and transferring the read data to said host when a read request is received from said host.

16. The recovery processing method for device specific information of a storage medium device according to claim 15, further comprising a step of writing back the write data on said temporary storage memory to said storage medium by said head when a request from said host is not received.

17. The recovery processing method for device specific information of a storage medium device according to claim 10, further comprising a step of sending notification to the device user after said alternate device specific information is developed on said memory.

18. The recovery processing method for device specific information of a storage medium device according to claim 10, wherein said reading step comprises a step of reading information from a magnetic disk as said storage medium.

19. A storage medium device, comprising:
a storage medium having a system area for storing device specific information;
a head for either reading or writing data on a track of said storage medium;
an actuator for positioning said head on a desired track of said storage medium;
a memory for storing at least one of alternative device specific information, and device specific information indicating device status updated according to an operation of the device; and
a control unit for position said head on a system area of said storage medium, reading said device specific information stored in said system area onto said memory to execute either read or write of data on said desired track by said head referring to the device specific information of said memory, wherein said control unit reads said alternate device specific information stored in said storage medium and develops said alternate device specific information on said memory when detecting read error of said device specific information from the system area, and wherein said alternate device specific information indicates an initial device status before an updating according to the operation of the device.

* * * * *